United States Patent
Takahashi et al.

(10) Patent No.: US 12,162,150 B2
(45) Date of Patent: Dec. 10, 2024

(54) LEARNING METHOD, LEARNING APPARATUS, AND LEARNING SYSTEM

(71) Applicant: Preferred Networks, Inc., Tokyo (JP)

(72) Inventors: Kuniyuki Takahashi, Tokyo (JP); Shimpei Masuda, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 770 days.

(21) Appl. No.: 17/132,164

(22) Filed: Dec. 23, 2020

(65) Prior Publication Data

US 2021/0107144 A1    Apr. 15, 2021

Related U.S. Application Data

(63) Continuation of application No. PCT/JP2019/026414, filed on Jul. 3, 2019.

(30) Foreign Application Priority Data

Jul. 4, 2018 (JP) .................. 2018-127803

(51) Int. Cl.
- *G06F 17/00* (2019.01)
- *B25J 9/16* (2006.01)
- *G05B 13/02* (2006.01)

(52) U.S. Cl.
CPC ............ *B25J 9/163* (2013.01); *G05B 13/027* (2013.01)

(58) Field of Classification Search
CPC .................. B25J 9/163; G05B 13/027; G05B 2219/39298; G05B 2219/40515; G05B 19/42; G06N 20/00

USPC .......................................................... 700/253
See application file for complete search history.

(56) References Cited

U.S. PATENT DOCUMENTS

| | | | | |
|---|---|---|---|---|
| 8,554,370 B2 * | 10/2013 | Goswami | ................. | B25J 9/163 |
| | | | | 700/254 |
| 9,358,685 B2 * | 6/2016 | Meier | ...................... | B25J 9/163 |
| 9,604,359 B1 * | 3/2017 | Grotmol | ................ | G06N 20/00 |
| 9,789,605 B2 * | 10/2017 | Meier | ................... | G05D 1/0088 |
| 10,317,854 B2 | 6/2019 | Nakagawa et al. | | |

(Continued)

FOREIGN PATENT DOCUMENTS

| CN | 110023965 A | * | 7/2019 | ............. | B25J 9/163 |
|---|---|---|---|---|---|
| JP | 2004-322224 | | 11/2004 | | |

(Continued)

OTHER PUBLICATIONS

An Introductory Robot Programming Tutorial (Year: 23).*

(Continued)

*Primary Examiner* — Ronnie M Mancho
(74) *Attorney, Agent, or Firm* — IPUSA, PLLC (57) ABSTRACT

A robot control device includes at least one memory, and at least one processor, wherein the at least one processor is configured to obtain environmental information in a real environment, obtain information related to an action to be performed by a robot in the real environment based on the environmental information and a first policy, obtain information related to a control value that causes the robot to perform the action based on the information related to the action and a second policy, and control the robot based on the information related to the control value. The first policy is learned by using a virtual robot in a simulation environment.

21 Claims, 8 Drawing Sheets

(56) References Cited

U.S. PATENT DOCUMENTS

| | | | |
|---|---|---|---|
| 10,322,507 B2* | 6/2019 | Meier | G05D 1/0033 |
| 10,717,196 B2 | 7/2020 | Yamazaki et al. | |
| 10,935,982 B2* | 3/2021 | Yao | B60W 10/06 |
| 11,148,296 B2* | 10/2021 | Breazeal | G10L 15/22 |
| 11,331,803 B2* | 5/2022 | Bank | B25J 13/08 |
| 11,400,587 B2* | 8/2022 | Levine | B25J 9/163 |
| 11,645,444 B2* | 5/2023 | Scheutz | G06F 40/00 |
| | | | 706/46 |
| 11,688,160 B2* | 6/2023 | Yao | G08G 1/16 |
| | | | 706/17 |
| 2015/0217449 A1* | 8/2015 | Meier | G05D 1/0033 |
| | | | 901/1 |
| 2016/0151917 A1* | 6/2016 | Faridi | B25J 11/0015 |
| | | | 700/259 |
| 2016/0279790 A1* | 9/2016 | Meier | B25J 9/1656 |
| 2018/0099409 A1* | 4/2018 | Meier | G06N 20/00 |
| 2019/0232489 A1* | 8/2019 | Pascanu | G06N 3/008 |
| 2019/0250568 A1* | 8/2019 | Li | G06N 7/01 |
| 2022/0024037 A1* | 1/2022 | Lee | B25J 13/08 |
| 2022/0026920 A1* | 1/2022 | Ebrahimi Afrouzi | |
| | | | G05D 1/0219 |
| 2022/0143821 A1* | 5/2022 | Bashkirov | G06N 3/084 |

FOREIGN PATENT DOCUMENTS

| | | | | |
|---|---|---|---|---|
| JP | 2017-030135 | | 2/2017 | |
| JP | 2017-064910 | | 4/2017 | |
| JP | 2017-185577 | | 10/2017 | |
| JP | 2019530105 A | * | 10/2017 | |
| JP | 2017-211913 | | 11/2017 | |
| JP | 6875513 B2 | * | 5/2021 | B25J 9/163 |

OTHER PUBLICATIONS

Learning for a Robot: Deep Reinforcement Learning, Imitation Learning, Transfer Learning (Year: 2021).*

Peng, Xue Bin, et al., "Deeploco: Dynamic locomotion skills using hierarchical deep reinforcement learning." ACM Transactions on Graphics, vol. 36, No. 4, Article 41. Publication date: Jul. 2017.

Peng, Xue Bin, et al., "DeepLoco: Dynamic Locomotion Skills Using Hierarchical Deep Reinforcement Learning"Transactions on Graphics (Proc. ACM SIGGRAPH 2017), <URL:https://www.cs.ubc.ca/~van/papers/2017-TOG-deepLoco/>.

Peng, Xue Bin, et al., "Deeploco: Dynamic locomotion skills using hierarchical deep reinforcement learning. [SIGGRAPH 2017] DeepLoco: Highlights" published on Apr. 27, 2017, <URL:https://www.youtube.com/watch?v=G4IT9CLyCNw&feature=emb_logo>.

Peng, Xue Bin, et al., "Deeploco: Dynamic locomotion skills using hierarchical deep reinforcement learning. SIGGRAPH 2017: DeepLoco paper (main video)" published on Apr. 27, 2017,<URL:https://www.youtube.com/watch?v=hd1yvLWm6oA&feature=emb_logo>.

Peng, Xue Bin, et al., "Deeploco: Dynamic locomotion skills using hierarchical deep reinforcement learning supplementary video. SIGGRAPH 2017 DeepLoco (supplemental video)" published on Apr. 27, 2017, <URL:https://www.youtube.com/watch?v=x-HrYko_MRU&feature=emb_logo>.

Rajeswaran, Aravind, et al., "Learning complex dexterous manipulation with deep reinforcement learning and demonstrations." arXiv:1709.10087v2, revised Jun. 26, 2018.

Bengio, Yoshua, et al., "Curriculum learning." Proceedings of the 26th International Conference on Machine Learning, Montreal, Canada, 2009.

Ietra418 (id: jack_and_rozz), "Not a blog Curriculum Learning [Bengio, ICML'09] " published on Jun. 23, 2016, <URL: https://letra418.hatenablog.com/entry/2016/06/23/174503>.

Carlos Florensa et al., "Reverse curriculum generation for reinforcement learning." arXiv:1707.05300v3, revised Jul. 23, 2018.

Bousmalis, Konstantinos, et al. "Using simulation and domain adaptation to improve efficiency of deep robotic grasping." arXiv:1709.07857v2, revised Sep. 25, 2017.

Carlos Florensa et al., "Reverse Curriculum Generation for Reinforcement Learning", arXiv:1707.05300v2, 1st Conference on Robot Learning (CoRL 2017), Mountain View, United States, Oct. 17, 2017.

Richard S. Sutton et al., "Reinforcement Learning: An Introduction—1.3 Elements of Reinforcement Learning", A Bradford Book, The MIT Press, Cambridge, Massachusetts / London, England (Jan. 4, 2005) Retrieved from Internet <http://incompleteideas.net/book/first/ebook/node9.html>.

Richard S. Sutton et al., "Reinforcement Learning: An Introduction—3.3 Returns", A Bradford Book, The MIT Press, Cambridge, Massachusetts / London, England (Jan. 4, 2005) Retrieved from Internet <http://incompleteideas.net/book/first/ebook/node30.html>.

* cited by examiner

FIG.8 ions, a learning apparatus, and a learning system

LEARNING METHOD, LEARNING APPARATUS, AND LEARNING SYSTEM

CROSS-REFERENCE TO RELATED APPLICATIONS

This application is a continuation application of International Application No. PCT/JP2019/026414 filed on Jul. 3, 2019, and designating the U.S., which is based upon and claims priority to Japanese Patent Application No. 2018-127803, filed on Jul. 4, 2018, the entire contents of which are incorporated herein by reference.

BACKGROUND

1. Technical Field

The disclosure herein relates to a learning method, a learning apparatus, a learning system, and a non-transitory computer-readable recording medium having stored therein a program.

2. Description of the Related Art

In recent years, various machine learning techniques have been used to enable robots having driving parts such as actuators to learn movements of achieving predetermined tasks (e.g., bipedal walking and object grasping).

However, deep reinforcement learning requires a large number of trials. Although the number of trials of deep reinforcement learning can be reduced by previously performing supervised learning, it is difficult to perform learning with a realistic number of trials in a real environment only. With respect to the above, a method called "Sim to Real" is known as a method to make results learned in a simulation environment applicable to a real environment.

SUMMARY

According to one aspect of the present invention, a robot control device includes at least one memory, and at least one processor, wherein the at least one processor is configured to obtain environmental information in a real environment, obtain information related to an action to be performed by a robot in the real environment based on the environmental information and a first policy, obtain information related to a control value that causes the robot to perform the action based on the information related to the action and a second policy, and control the robot based on the information related to the control value. The first policy is learned by using a virtual robot in a simulation environment. The first policy and the second policy include respective different neural networks. Deep reinforcement learning is used to update the respective different neural networks.

DETAILED DESCRIPTION

There is a case where it is difficult to apply results learned in the simulation environment to the real environment, for example, when a difference between the simulation environment and the real environment is large. For example, when a robot is trained to perform a task such as object grasping and bipedal walking, friction is generated at a driving part such as an actuator, or movement delay of a driving part occurs in the real environment. Therefore, there is a case where it is difficult to apply results learned in the simulation environment to the real environment.

An embodiment of the present invention has been made in view of the above point and it is desirable to facilitate an application of results learned in a simulation environment to a real environment.

The results learned in the simulation environment can be easily applied to the real environment.

The embodiment will be described in detail below with reference to the accompanying drawings. In the following, a learning system 1 that can efficiently learn movements of a robot by applying results learned in the simulation environment to the real environment will be described.

<Overall configuration>

Figure 1:
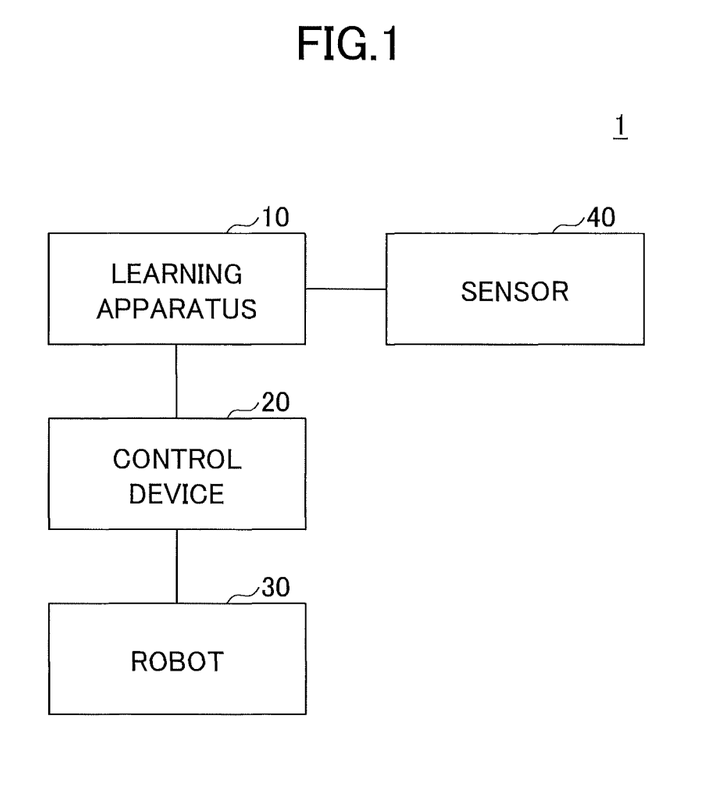
FIG. 1 is a drawing illustrating an example of an overall configuration of a learning system according to an embodiment of the invention.

First, an example of an overall configuration of the learning system 1 according to the present embodiment will be described with reference to FIG. 1. FIG. 1 is a drawing illustrating the example of the overall configuration of the learning system 1 according to the present embodiment.

As illustrated in FIG. 1, the learning system 1 according to the present embodiment, for example, includes a learning apparatus 10, a control device 20, a robot 30, and a sensor 40.

The learning apparatus 10 is a computer or a computer system for learning a movement of the robot 30 that achieves a predetermined task (e.g., bipedal walking and object grasping) by using deep reinforcement learning. The learning apparatus 10 performs deep reinforcement learning of the robot 30 in the simulation environment (which will be hereinafter referred to as a virtual device or a virtual robot) and deep reinforcement learning of the robot 30 in the real environment (i.e., a real device), thereby learning the movement of the robot 30 that achieves the task.

At this time, for example, the learning apparatus 10 learns a movement of the robot 30 that achieves a task in the simulation environment (what is called planning), and learns a control value of a driving part (e.g., an actuator) that is required to perform the movement in the real environment. Here, the control value is, for example, a current value or the like of the driving part that is required to perform the movement. In the present embodiment, for example, the following description assumes that the control value is a current value of the driving part, but the control value is not limited to this. The learning apparatus 10 according to the present embodiment learns a movement of the robot 30 in the simulation environment and a movement of the robot 30 in the real environment by using curriculum learning, and repeats the above learning in a predetermined order.

As the predetermined order, any order that satisfies (1) and (2) below can be adopted.

(1) After learning in the simulation environment, learning in the simulation environment or learning in the real environment is performed to learn a task having the same degree of complexity or a task having a higher degree of complexity.

(2) After learning in the real environment, learning is performed in the real environment to learn a task having the same degree of complexity of a task already learned in the simulation environment or learning is performed in the simulation environment to learn a task having a higher degree of complexity.

Specifically, for example, tasks of the robot 30 to be learned are v1 and v2, and the degree of complexity of v2 is greater than the degree of complexity of v1.

In this case, orders exemplified by (A), (B), and (C) below each satisfy the predetermined order above.

(A) The movement of the robot 30 is learned in the order of learning of the task v1 in the simulation environment, learning of the task v1 in the real environment, learning of the task v2 in the simulation environment, and learning of the task v2 in the real environment.

(B) The movement of the robot 30 is learned in the order of learning of the task v1 in the simulation environment, learning of the task v2 in the simulation environment, learning of the task v1 in the real environment, and learning of the task v2 in the real environment.

(C) The movement of the robot 30 is learned in the order of learning of the task v1 in the simulation environment, learning of the task v1 in the simulation environment, learning of the task v2 in the simulation environment, learning of the task v1 in the real environment, learning of the task v1 in the real environment, and learning of the task v2 in the real environment.

The degree of complexity of the task represents complexity of a movement to be performed by the robot 30. For example, if the robot 30 is a bipedal walking robot, the degree of complexity of the task may increase in the order of "walking slowly", "walking quickly", and "run". The degree of complexity of the task can be determined by various methods. For example, if a first task and a second task differ in a success rate of a movement of the robot 30, a task with a low success rate may be considered as a task having a high degree of complexity. Additionally, for example, as the number of items to be considered in achieving a movement of the robot 30 increases, and as the computation amount required to control the robot 30 increases, it is conceivable that the complexity of the task becomes higher.

The control device 20 is a computer or a computer system that controls a movement of the robot 30. The control device 20 transmits an instruction for controlling a movement of the robot 30 to a driving part (e.g., an actuator) of the robot 30. This controls the movement of the robot 30.

Figure 2A:
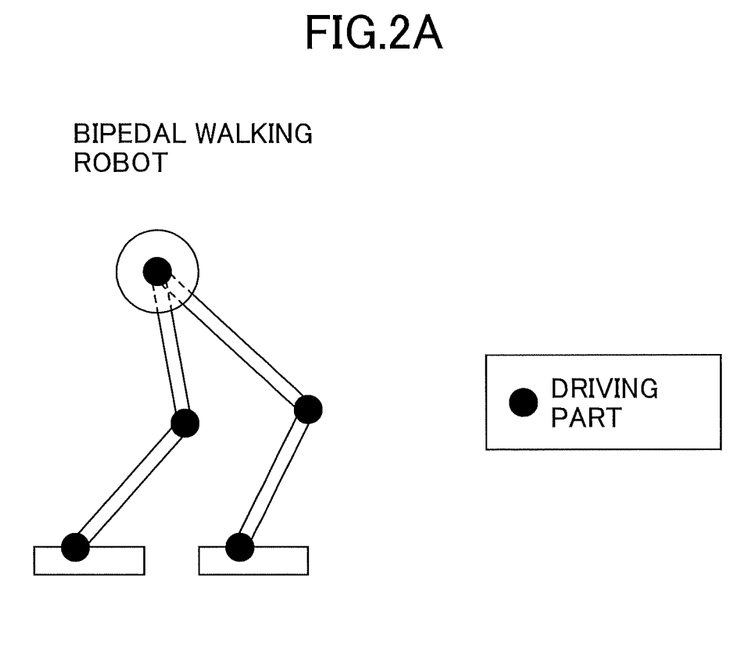
FIG. 2A is a drawing schematically illustrating an example of a robot according to the embodiment of the invention.
Figure 2B:
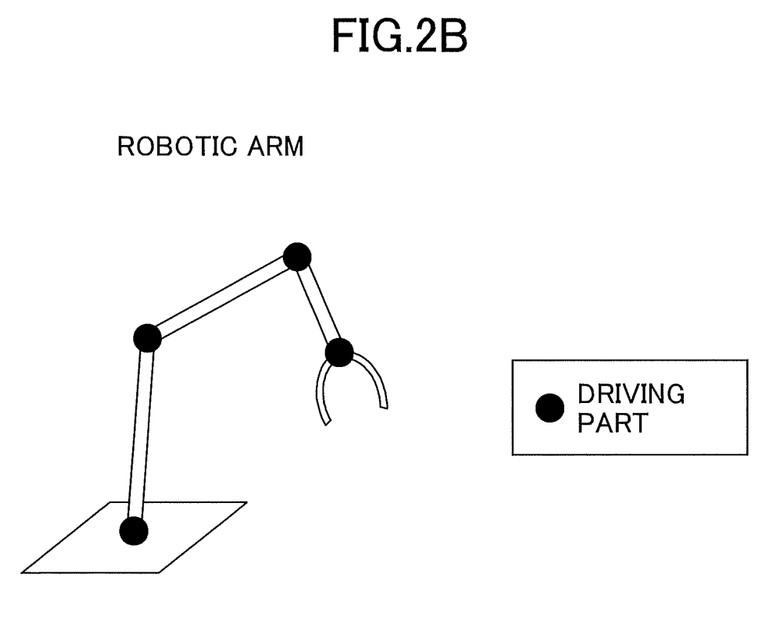
FIG. 2B is a drawing schematically illustrating an example of a robot according to the embodiment of the invention.

The robot 30 is a device or equipment having a driving part, such as an actuator. Examples of the robot 30 include a bipedal walking robot illustrated in FIG. 2A, a robotic arm illustrated in FIG. 2B, and the like. The bipedal walking robot illustrated in FIG. 2A and the robotic arm illustrated in FIG. 2B each include a driving part such as an actuator. Such a driving part is provided, for example, at a portion corresponding to a joint.

The sensor 40 may be, for example, a camera device, various measuring devices, or the like. The sensor 40 obtains, for example, an image captured by the camera device, a state of the driving part measured by the measuring device, or the like.

Here, the configuration of the learning system 1 illustrated in FIG. 1 is one example, and may be another configuration. For example, in the learning system 1 according to the present embodiment, the learning apparatus 10 and the control device 20 may be configured as a seamless apparatus. The learning system 1 according to the present embodiment may include multiple robots 30. Two or more learning apparatuses 10 and two or more control devices 20 may be used.

<Hardware Configuration>

Figure 3:
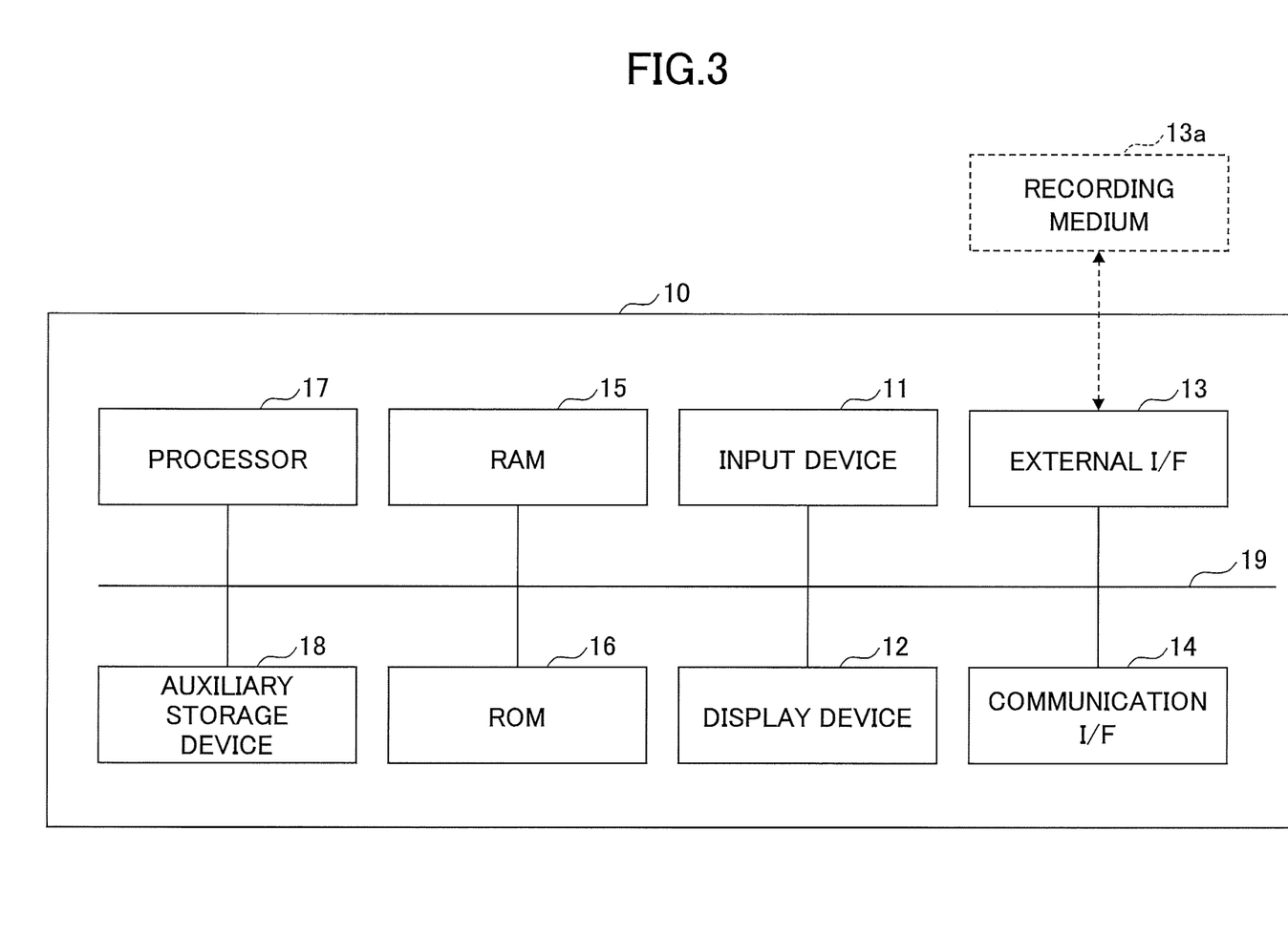
FIG. 3 is a drawing illustrating an example of a hardware configuration of a learning apparatus according to the embodiment of the invention.

Next, an example of a hardware configuration of the learning apparatus 10 according to the present embodiment will be described with reference to FIG. 3. FIG. 3 is a drawing illustrating the example of the hardware configuration of the learning apparatus 10 according to the present embodiment.

As illustrated in FIG. 3, the learning apparatus 10 according to the present embodiment, for example, includes an input device 11, a display device 12, an external I/F 13, a communication I/F 14, a random access memory (RAM) 15, a read only memory (ROM) 16, a processor 17, and an auxiliary storage device 18. Each of these hardware components is interconnected through a bus 19.

The input device 11 may be, for example, a keyboard, a mouse, a touch panel, or the like, and is used by a user to input various operations. The display device 12 may be, for example, a display or the like to display various processing results of the learning apparatus 10. The learning apparatus 10 may not include at least either the input device 11 or the display device 12.

The external I/F 13 is an interface with an external device. The external device may be a recording medium 13a or the like. The learning apparatus 10 can, for example, read from or write to the recording medium 13a or the like through the external I/F 13. One or more programs achieving each functional unit of the learning apparatus 10 may be recorded in the recording medium 13a.

The recording medium 13a may be, for example, a flexible disk, a compact disc (CD), a digital versatile disk (DVD), a secure digital (SD) memory card, a universal serial bus (USB) memory card, or the like.

The communication I/F 14 is an interface for connecting the learning apparatus 10 to a communication network. The one or more programs achieving respective functional units of the learning apparatus 10 may be obtained (or downloaded) from a predetermined server device or the like through the communication I/F 14.

The RAM 15 is a volatile semiconductor memory that temporarily stores a program and data. The ROM 16 is a non-volatile semiconductor memory that can store a program and data even when the power is turned off. The ROM 16 may store, for example, settings related to an operating system (OS), settings related to the communication network, and the like.

The processor 17 may be, for example, a central processing unit (CPU), a graphics processing unit (GPU), or the like, and is an arithmetic unit that loads a program and data from the ROM 16, the auxiliary storage device 18, or the like into the RAM 15 and executes processing. The learning apparatus 10 may include both the CPU and the GPU as the processor 17, or may include only either the CPU or the GPU.

The auxiliary storage device 18 may be, for example, a hard disk drive (HDD) or a solid state drive (SSD) and is a non-volatile storage device that stores a program and data. The auxiliary storage device 18 may store, for example, an OS, various application software, one or more programs for achieving respective functional units of the learning apparatus 10, and the like.

The learning apparatus 10 according to the present embodiment has the hardware configuration illustrated in FIG. 3, so that various processes described later can be achieved. In the example illustrated in FIG. 3, a case in which the learning apparatus 10 according to the present embodiment is achieved by one device (i.e., one computer) has been described, but the present embodiment is not limited to this. The learning apparatus 10 according to the present embodiment may be achieved by multiple devices (i.e., multiple computers).

<Function Configuration>

Figure 4:
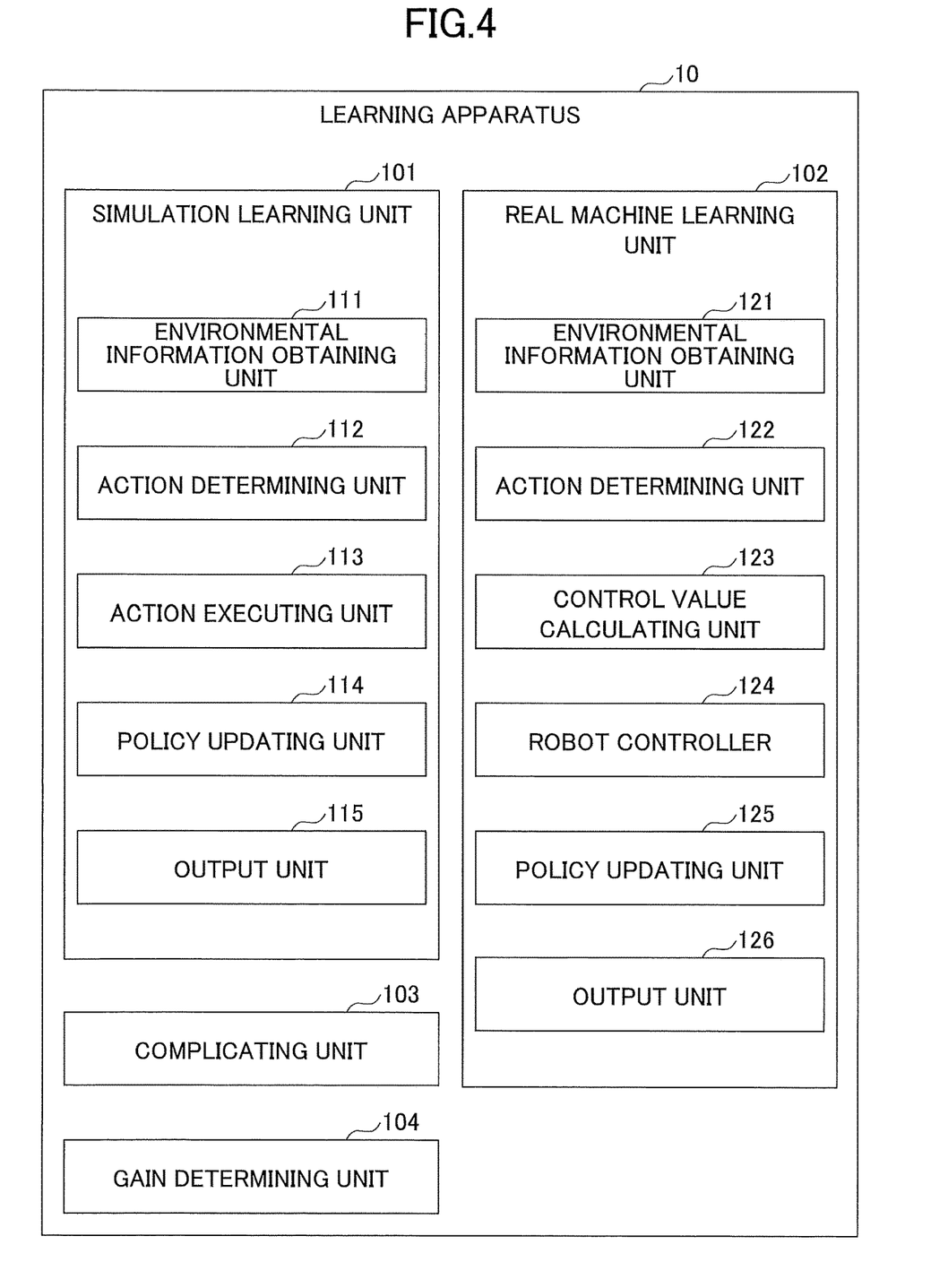
FIG. 4 is a drawing illustrating an example of a functional configuration of the learning apparatus according to the embodiment of the invention.

Next, an example of a functional configuration of the learning apparatus 10 according to the present embodiment will be described with reference to FIG. 4. FIG. 4 is a drawing illustrating the example of the functional configuration of the learning apparatus 10 according to the present embodiment.

As illustrated in FIG. 4, the learning apparatus 10 according to the present embodiment includes a simulation learning unit 101, a real machine learning unit 102, a complicating unit 103, and a gain determining unit 104. Each of these functional units is achieved by a process that one or more programs installed in the learning apparatus 10 causes the processor 17 to execute.

The simulation learning unit 101 learns a movement of the robot 30 that achieves a predetermined task in the simulation environment (precisely, a virtual robot that simulates the robot 30) by using deep reinforcement learning. Here, the simulation learning unit 101 according to the present embodiment includes an environmental information obtaining unit 111, an action determining unit 112, an action executing unit 113, a policy updating unit 114, and an output unit 115.

The environmental information obtaining unit 111 obtains environmental information $s_{t,s}$ in the simulation environment. Here, the environmental information $s_{t,s}$ is an observed value at time t in the simulation environment. This observed value is information observed by the sensor 40 (i.e., precisely, a virtual camera) in the simulation environment (e.g., an image obtained by imaging an object to be held in the simulation environment, an image obtained by imaging a walking route in the simulation environment, and a measured value of the driving part of the robot 30 in the simulation environment). The present invention is not limited to this, and the environmental information obtaining unit 111 may obtain, for example, environmental information during past several hours (specifically, for example, environmental information $s_{t-N,s}$, ..., $s_{t,s}$ from time t–N to time t with respect to a preset natural number N).

The action determining unit 112 determines an action $a_{t,s}$ by using a policy $\pi_{sim}$ in the simulation environment. Here, the action $a_{t,s}$ is an output value of the driving part at time t in the simulation environment. The output value of the driving unit may be, for example, a torque value of the driving unit. In the present embodiment, the output value of the drive unit will be described as the torque value for example, but the present embodiment is not limited to this.

The action $a_{t,s}$ is determined by inputting the environmental information obtained by the environmental information obtaining unit 111 to the policy $\pi_{sim}$.

The action executing unit 113 executes the action $a_{t,s}$ determined by the action determining unit 112. That is, the action executing unit 113 drives the driving part of the robot 30 in the simulation environment with the torque value indicated by the action $a_{t,s}$. This causes the robot 30 to move in the simulation environment. The robot 30 executes the action $a_{t,s}$, so that the environment transitions to $s_{t+1,s}$ and a reward $r_{t+1,s}$ is obtained. Here, the reward $r_{t,s}$ is a reward at time t in the simulation environment and is predetermined, for example, by a user or the like.

The policy updating unit 114 updates the policy $\pi_{sim}$ in the simulation environment. That is, the policy updating unit 114, for example, updates the policy $\pi_{sim}$ so that a gain $R_s$, which is also referred to as a "return Rs", that is obtained as the sum of net present values of the reward $r_{t,s}$, is maximized (i.e., more precisely, an expected value of the gain $R_s$ is maximized).

The output unit 115 outputs the policy $\pi_{sim}$ updated by the policy updating unit 114 and the gain $R_s$.

The real machine learning unit 102 learns a control value in order to perform a predetermined movement in the real environment (i.e., a movement of the robot 30 that achieves the predetermined task learned in the simulation environment) by using deep reinforcement learning. In the present embodiment, a current value required for the driving unit is learned as the control value. Here, the real machine learning unit 102 according to the present embodiment includes an environmental information obtaining unit 121, an action determining unit 122, a control value calculating unit 123, a robot controller 124, a policy updating unit 125, and an output unit 126.

The environmental information obtaining unit 121 obtains environmental information $s_{t,r}$ in the real environment. Here, the environmental information $s_{t,r}$ is an observed value at time t in the real environment. The observed value is information observed by the sensor 40 in the real environment (e.g., an image obtained by imaging an object to be held in the real environment, an image obtained by imaging a walking route in the real environment, and a measured value of the driving part of the robot 30 in the real environment). The present embodiment is not limited to this, and the environmental information obtaining unit 121 may obtain, for example, environmental information during past several hours (specifically, for example, environmental information $s_{t-N,r}$, ..., $s_{t,r}$ from time t–N to time t with respect to the preset natural number N).

The action determining unit 122 determines the action $a_{t,s}$ by using the policy $\pi_{sim}$ in the simulation environment. The action $a_{t,s}$ is determined by inputting the environmental information obtained by the environmental information obtaining unit 121 to the policy $\pi_{sim}$.

The control value calculating unit 123 calculates a control value $a_{t,r}$ that causes the action $a_{t,s}$ determined by the action determining unit 122 as a policy $\pi_{real}$. For example, the control value calculating unit 123 calculates a current value $a_{t,r}$ that causes a torque value $\tau_t$ indicated by the action $a_{t,s}$ as the policy $\pi_{real}$. Here, the policy $\pi_{real}$ outputs the control value $a_{t,r}$ that maximizes an expected value of an action value function expressed by a neural network in the environmental information $s_{t,r}$.

The robot controller 124 controls the movement of the robot 30 by using the control value $a_{t,r}$ calculated by the control value calculating unit 123 (i.e., the control value $a_{t,r}$ calculated as the policy $\pi_{real}$). This causes the robot 30 to move in the real environment. The robot 30 executes the action $a_{t,s}$ (i.e., the robot 30 is controlled by the current value $a_{t,r}$, and the robot 30 executes the action $a_{t,s}$), so that the environment transitions to $s_{t+1,r}$, and a reward $r_{t+1,r}$ is obtained. Here, the reward $r_{t,r}$ is a reward at time t in the real environment, and is predetermined by, for example, a user or the like.

The policy updating unit 125 updates the policy $\pi_{real}$ in the real environment. That is, the policy updating unit 125 updates the policy $\pi_{real}$ so as to maximize a gain $R_r$ that is obtained, for example, as the sum of net present values of the reward $r_{t,r}$ (more precisely, so as to maximize an expected value of the gain $R_r$).

The output unit 126 outputs the policy $\pi_{real}$ updated by the policy updating unit 125 and the gain $R_r$.

The complicating unit 103 complicates a task that is achieved by the movement of the robot 30 to be learned (i.e., increases the degree of complexity of a task). The gain determining unit 104 determines whether the gain exceeds a predetermined threshold value.

<Learning Process>

Figure 5:
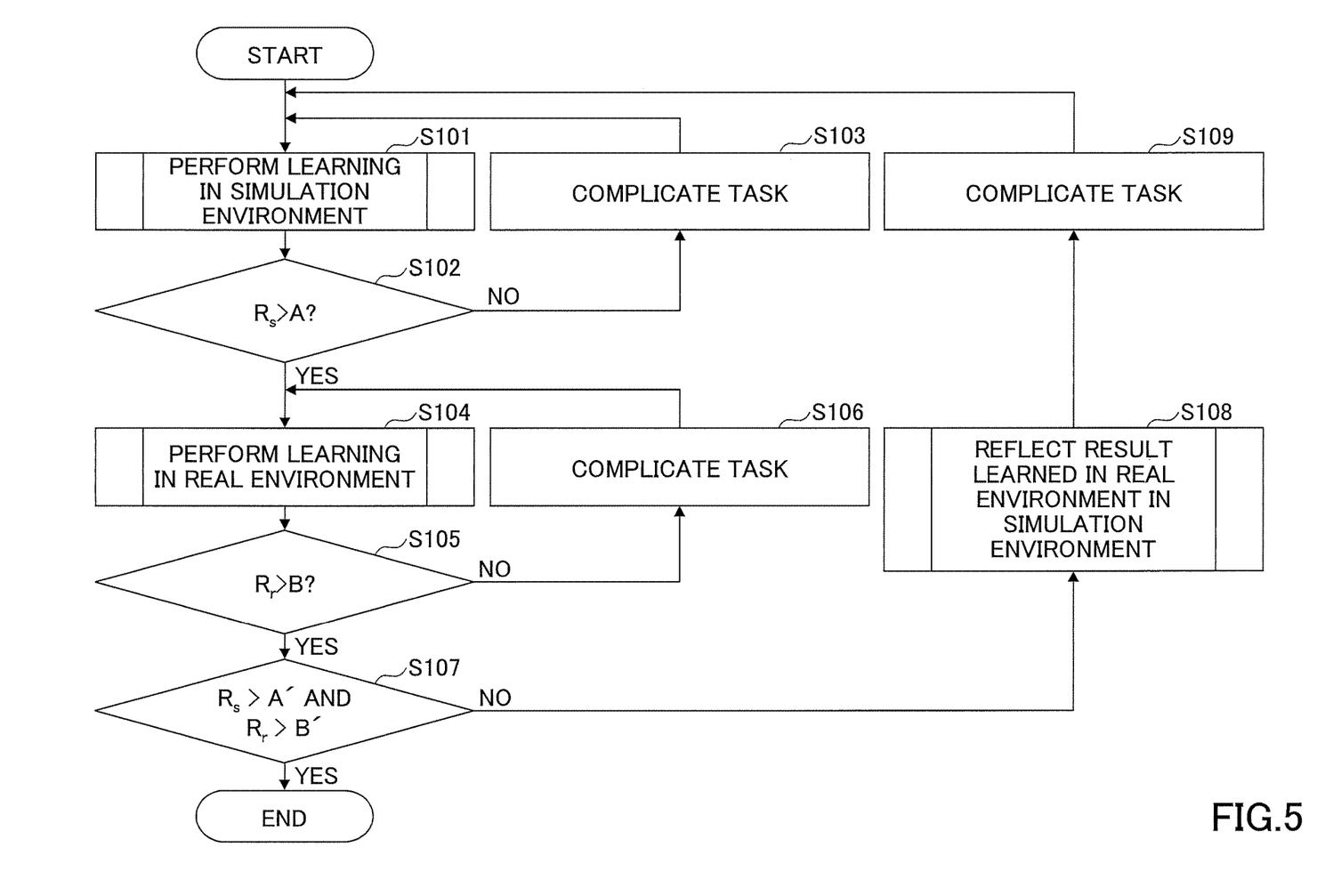
FIG. 5 is a flowchart illustrating an example of a learning process according to the embodiment of the invention.

In the following, a learning process performed by the learning system 1 according to the present embodiment will be described with reference to FIG. 5. FIG. 5 is a flowchart illustrating an example of the learning process according to the present embodiment.

In step S101, the simulation learning unit 101 learns the movement of the robot 30 that achieves a predetermined task by using the simulation environment and the virtual robot 30, using deep reinforcement learning. This outputs the policy $\pi_{sim}$ and the gain $R_s$. At this time, for example, if the degree of complexity of the task is less than a predetermined degree of complexity, the movement of the robot 30 may be learned by using supervised learning.

Since the policy $\pi_{sim}$ and the gain $R_s$ are the policy $\pi_{sim}$ and the gain $R_s$ for a certain task V, more precisely, the policy $\pi_{sim}$ and the gain $R_s$ are expressed by the policy $\pi_{sim,v}$ and the gain $R_{s,v}$. However, unless otherwise noted, the terms "$\pi_{sim}$" and "gain $R_s$" are simply used in the following. Details of the learning process in the simulation environment will be described later.

Next, in step S102, the gain determining unit 104 determines whether the gain $R_s$ exceeds a predetermined threshold value A. This indicates to determine whether learning in the simulation environment has been sufficiently performed.

If it is determined that the gain $R_s$ does not exceed the predetermined threshold value A in step S102, the complicating unit 103 complicates the task in step S103. This enables learning in the simulation environment in step S101 to be performed on a complex task.

However, in step S103, the complicating unit 103 may not complicate the task. In this case, learning in the simulation environment in step S101 is performed on a task having the same degree of complexity.

If it is determined that the gain Rs exceeds the predetermined threshold value A in step S102, in step S104, the real machine learning unit 102 learns the current value of the driving unit that is necessary for the robot 30 in the real environment to perform a predetermined movement (i.e., a movement of the robot 30 that achieves the predetermined task learned in the simulation environment) in the real environment by using deep reinforcement learning. This outputs the policy $\pi_{real}$ and the gain $R_r$.

Here, similarly with step S101 described above, more precisely, the policy $\pi_{real}$ and the gain $R_r$ are expressed by the policy $\pi_{real,v}$ and gain $R_{r,v}$. However, unless otherwise noted, the terms "$\pi_{real}$" and "gain $R_r$" are simply used in the following. Details of the learning process in the real environment will be described later.

Next, in step S105, the gain determining unit 104 determines whether the gain $R_r$ exceeds a predetermined threshold value B. This indicates to determine whether learning in the real environment has been sufficiently performed.

If it is determined that the gain $R_r$ does not exceed the predetermined threshold value B in step S105, the complicating unit 103 complicates the task in step S106. This enables learning in the real environment in step S104 described above to be performed on a complex task.

However, in step S106, the complicating unit 103 may not complicate the task. In this case, learning in the real environment in step S104 described above is performed on the task having the same degree of complexity.

If it is determined that the gain $R_r$ exceeds the predetermined threshold value B in step S105, in step S107, the gain determining unit 104 determines whether the gain $R_s$ exceeds a predetermined threshold value A' and whether the gain $R_r$ exceeds a predetermined threshold value B'. The threshold value A' is set to be, for example, a value greater than or equal to the threshold value A. Similarly, the threshold value B' is set to be, for example, a value greater than or equal to the threshold value B.

If it is determined that the gain $R_s$ exceeds the predetermined threshold value A' and the gain $R_r$ exceeds the predetermined threshold value B' in step S107, the learning apparatus 10 terminates the learning process. As a result, the movement of each task of the robot 30 in the real environment is learned.

If it is determined that the gain $R_s$ exceeds the predetermined threshold value A' and it is not determined that the gain $R_r$ exceeds the predetermined threshold value B' in step S107, in step S108, the simulation learning unit 101 reflects a result learned in the real environment (i.e., the policy $\pi_{real}$ output in step S104 above) in the simulation environment. Details of a process that reflects the result learned in the real environment in the simulation environment will be described later.

However, step S108 described above may not be performed. In this case, step S109 described later is performed without step S108 being performed.

Next, in step S109, the complicating unit 103 complicates the task. This enables learning in the simulation environment of step S101 described above to be performed of a complex task.

Figure 6:
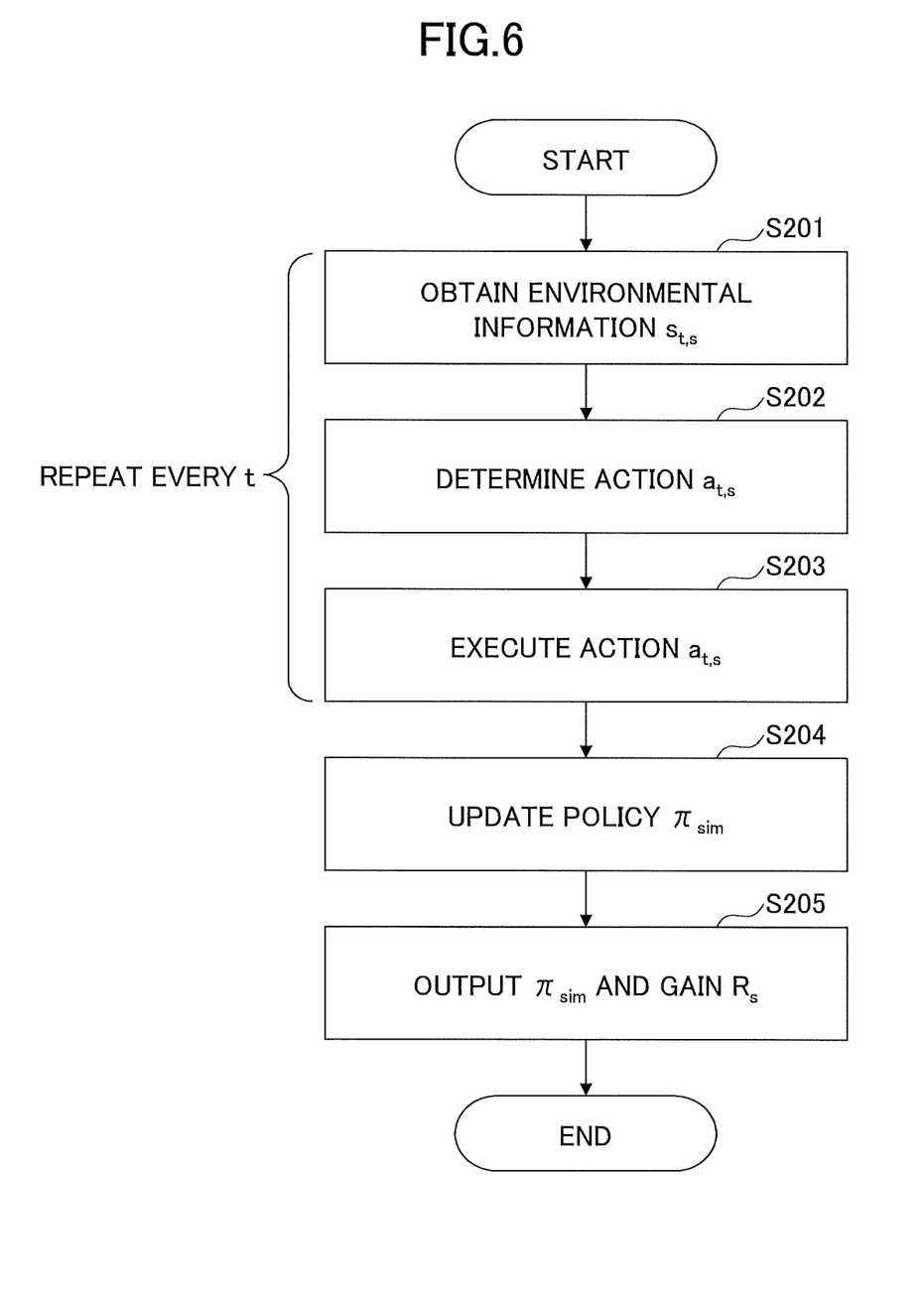
FIG. 6 is a flowchart illustrating an example of a learning process in a simulation environment.

Here, the process of step S101 described above (i.e., the learning process in the simulation environment) will be described in detail with reference to FIG. 6. FIG. 6 is a flowchart illustrating an example of the learning process in the simulation environment. Step S201 to step S203 of FIG. 6 are repeatedly executed every simulation time t, for example, when time for learning in the simulation environment is t=1, ..., T1. As described above, if the degree of complexity of the task is less than or equal to a predetermined degree of complexity, learning processing may be performed by using supervised learning. At this time, training data (i.e., a correct action $a_{t,s}$) may be provided by a user.

In step S201, the environmental information obtaining unit 111 obtains the environmental information $s_{t,s}$ in the simulation environment.

Next, in step S202, the action determining unit 112 determines the action $a_{t,s}$ that achieves the task by using the policy $\pi_{sim}$ in the simulation environment.

Next, in step S203, the action executing unit 113 executes the action $a_{t,s}$ determined by the action determining unit 112. That is, the action executing unit 113 performs simulation in which the driving part of the virtual robot 30 in the simulation environment is driven with the torque value indicated by the action $a_{t,s}$. The virtual robot 30 executes the action $a_{t,s}$, so that the environment transitions to $s_{t+1,s}$ and the reward $r_{t+1,s}$ is obtained.

In step S204, the policy updating unit 114 updates the policy $\pi_{sim}$ in the simulation environment. That is, the policy updating unit 114 updates the policy $\pi_{sim}$ so as to maximize the gain $R_s$ that is obtained, for example, as the sum of the net present values of the reward $r_{t,s}$.

In step S205, the output unit 115 outputs the policy $\pi_{sim}$ updated by the policy updating unit 114 and the gain $R_s$. This outputs the policy $\pi_{sim}$ and the gain $R_s$ for a certain task.

Figure 7:
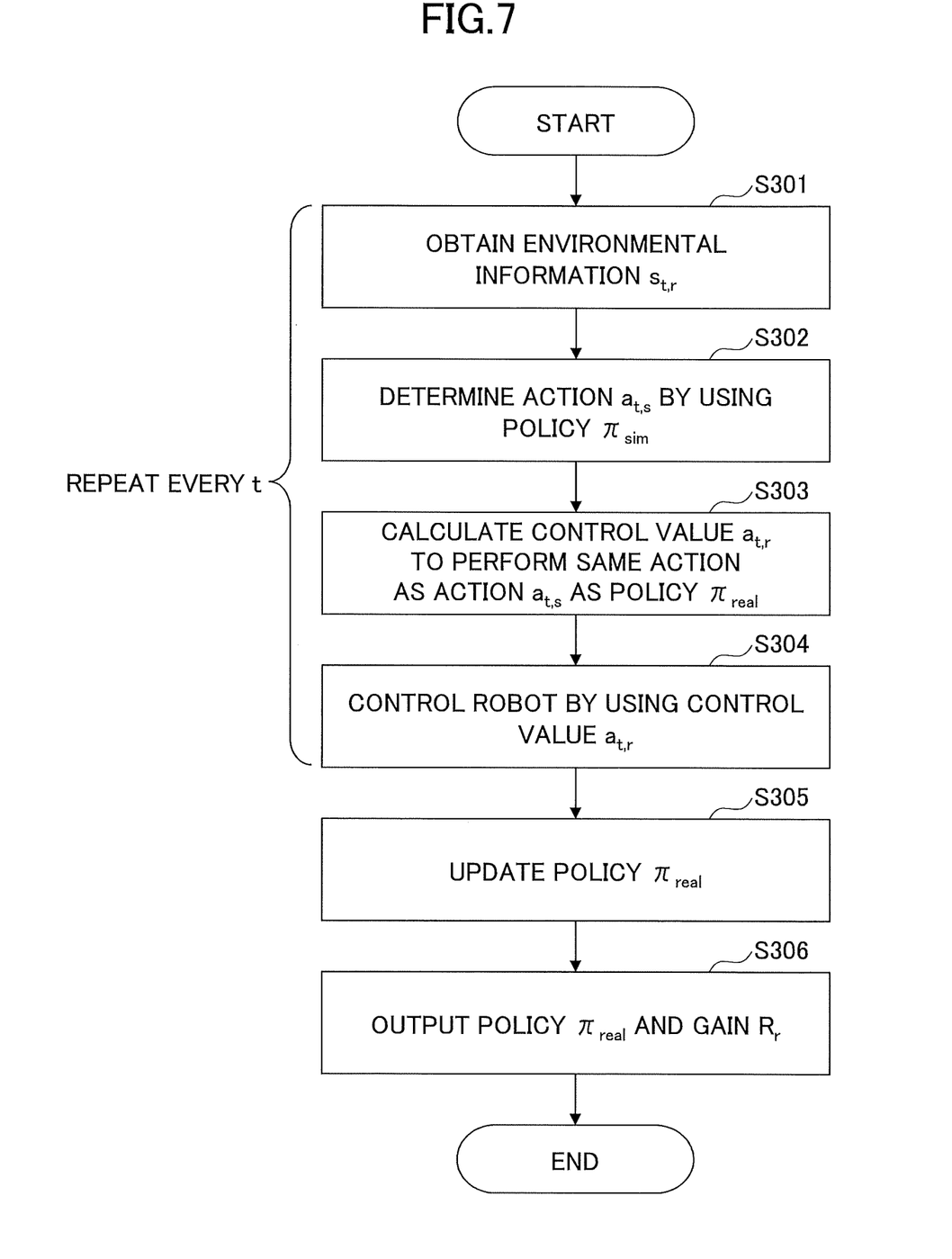
FIG. 7 is a flowchart illustrating an example of a learning process in a real environment.

In the following, details of a process of step S104 described above (i.e., the learning process in the real environment) will be described with reference to FIG. 7. FIG. 7 is a flowchart illustrating an example of the learning process in the real environment. Step S301 to step S304 of FIG. 7 are repeatedly executed every real time t, for example, when learning time in the real environment is t=1, ..., T2.

In step S301, the environmental information obtaining unit 121 obtains the environmental information $s_{t,r}$ in the real environment.

Next, in step S302, the action determining unit 122 determines the action $a_{t,s}$ by using the policy $\pi_{sim}$ in the simulation environment.

In step S303, the control value calculating unit 123 calculates the control value $a_{t,r}$ that causes the action $a_{t,s}$ determined by the action determining unit 122 as the policy $\pi_{real}$.

Here, the control value calculating unit 123 calculates the policy $\pi_{real}$ by, for example, using $\tau_t = \alpha C + \pi_{real}$, where $\tau_t$ is the torque value indicated by the action $a_{t,s}$, C is the current value $a_{t,r}$, and $\alpha$ is an arbitrary coefficient. Alternatively, the control value calculating unit 123 may calculate the policy $\pi_{real}$ by, for example, using $\tau_t = \pi_{real}$.

Next, in step S304, the robot controller 124 controls the movement of the robot 30 by using the control value $a_{t,r}$ calculated by the control value calculating unit 123 (i.e., the control value $a_{t,r}$ calculated as the policy $\pi_{real}$). This causes the robot 30 to move in the real environment, so that the environment transitions to $s_{t+1,r}$, and the reward $r_{t+1,r}$ is obtained.

In step S305, the policy updating unit 125 updates the policy $\pi_{real}$ in the real environment. That is, the policy updating unit 125 updates the policy $\pi_{real}$ so as to maximize the gain $R_r$ obtained as the sum of the net present values of the reward $r_{t,r}$, for example.

In step S306, the output unit 126 outputs the policy $\pi_{real}$ updated by the policy updating unit 125 and the gain $R_r$. This outputs the policy $\pi_{real}$ and gain $R_r$ for a certain task.

Figure 8:
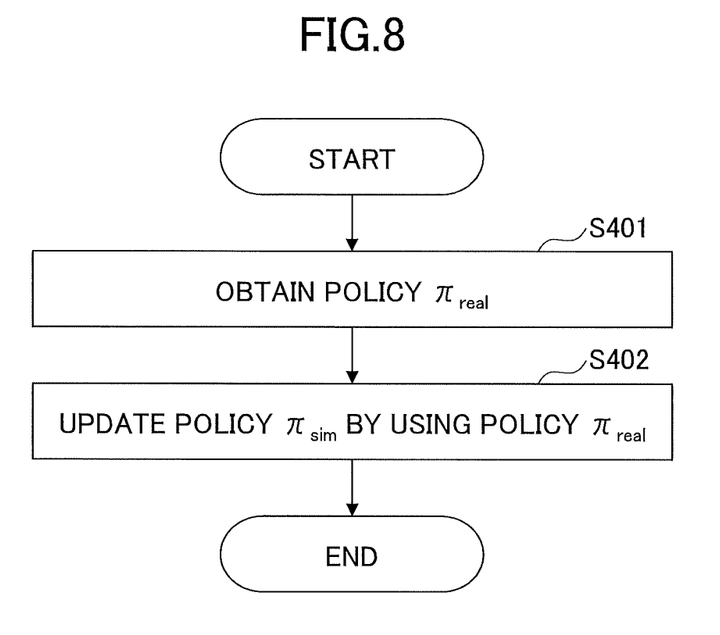
FIG. 8 is a flowchart illustrating an example of a process of reflecting results learned in the real environment in the simulation environment.

In the following, details of the process of step S108 described above (i.e., the process of reflecting the result learned in the real environment in the simulation environment) will be described with reference to FIG. 8. FIG. 8 is a flowchart illustrating an example of the process of reflecting a result learned in the real environment in the simulation environment.

First, in step S401, the policy updating unit 114 obtains the policy $\pi_{real}$, which is a result learned in the real environment.

Next, in step S402, the policy updating unit 114 updates the policy $\pi_{sim}$ by using the policy $\pi_{real}$. The policy updating unit 114 may update the policy $\pi_{sim}$ by using not only the policy $\pi_{real}$ but also, for example, data obtained during learning the policy $\pi_{real}$ (e.g., environmental information $s_{t,r}$ in the real environment at each time t).

This reflects the result learned in the real environment in the simulation environment. The policy $\pi_{sim}$ uses the policy $\pi_{real}$ for the same task (i.e., as in the real environment, the policy $\pi_{sim}$ for the same task is used in the simulation environment to determine a control value (i.e., the action $a_{t,s}$) and drive the virtual robot 30 by using the control value).

SUMMARY

As described above, in the learning system 1 according to the present embodiment, learning in the simulation environment and learning in the real environment are repeated in a predetermined order while increasing the degree of complexity of a task by using curriculum learning. At this time, in the simulation environment, the movement of the robot 30 that achieves the task (i.e., what is called planning) is learned, and in the real environment, the control value of the driving part (for example, the actuator) required to perform the movement is learned. That is, in the learning system 1 according to the present embodiment, different neural networks are respectively used for an action value function used for the policy $\pi_{sim}$ in the simulation environment and an action value function used for the policy $\pi_{real}$ in the real environment. Further, in the learning system 1 according to the present embodiment, the result learned in the real environment is reflected in the simulation environment.

Thus, in the learning system 1 according to the present embodiment, the result learned in the simulation environment can be easily applied to the real environment even when a difference between the real environment and the simulation environment is large (e.g., when friction is generated in the driving part such as the actuator or when a contact between the robot 30 and the real environment occurs) or when movement delay of the driving part occurs in the real environment.

Therefore, in the learning system 1 according to the present embodiment, the time required for the robot 30 to learn a movement that achieves a predetermined task can be significantly reduced. Further, in the learning system 1 according to the present embodiment, since the control value of the driving part for performing a predetermined movement is learned during learning in the real environment, modeling of an actuator or the like is not required, for example.

In the present embodiment, a bipedal walking robot and a robotic arm are exemplified as the robot 30, but the robot 30 is not limited to this. The present embodiment can be applied to learning of a movement in order for various robots having driving parts to achieve predetermined tasks. Examples of such a robot include a personal robot, a disaster rescue robot, and an industrial robot.

The present invention is not limited to the embodiment specifically disclosed above, and various modifications and alterations can be made without departing from the scope of the claims.

What is claimed is:

1. A control device comprising:
    at least one memory; and
    at least one processor,
    wherein the at least one processor is configured to
        obtain first environmental information in a simulation environment;
        obtain first information related to control of a virtual object to be controlled based on the first environmental information and a first neural network;

control the virtual object to be controlled based on the first information;
update the first neural network based on a result of the controlling of the virtual object to be controlled using reinforcement learning,
obtain second environmental information in a real environment,
obtain second information related to control of an object to be controlled in the real environment based on the second environmental information and the first neural network
obtain third information related to the control of the object to be controlled based on the second information and a second neural network that is updated using reinforcement learning, and
control the object to be controlled based on the third information, and
wherein, after the updating of the first neural network is performed using a first task, the updating of the first neural network is performed using a second task, a degree of complexity of the second task exceeding a degree of complexity of the first task.

2. The control device as claimed in claim 1, wherein the at least one processor is further configured to update the second neural network by using at least one of a plurality of objects to be controlled in the real environment including the object to be controlled.

3. The control device as claimed in claim 1, wherein the second environmental information includes information related to at least one of an image in the real environment or a measured value of a driving part of the object to be controlled.

4. A system comprising:
the control device as claimed in claim 1;
at least one sensor configured to obtain the second environmental information; and
the object to be controlled.

5. A control method performed by at least one processor, the control method comprising:
obtaining first environmental information in a simulation environment;
obtaining first information related to control of a virtual object to be controlled based on the first environmental information and a first neural network;
controlling the virtual object to be controlled based on the first information;
updating the first neural network based on a result of the controlling of the virtual object to be controlled using reinforcement learning,
obtaining second environmental information in a real environment,
obtaining second information related to control of an object to be controlled in the real environment based on the second environmental information and the first neural network,
obtaining third information related to the control of the object to be controlled based on the second information and a second neural network that is updated using reinforcement learning, and
controlling the object to be controlled based on the third information,
updating the first neural network using data obtained from the real environment.

6. A method performed by at least one processor, the method comprising:
obtaining first environmental information in a simulation environment;
obtaining first information related to control of a virtual object to be controlled based on the first environmental information and a first neural network;
controlling the virtual object to be controlled based on the first information;
updating the first neural network based on a result of the controlling of the virtual object to be controlled using reinforcement learning,
obtaining second environmental information in a real environment,
obtaining second information related to control of an object to be controlled in the real environment based on the second environmental information and the first neural network,
obtaining third information related to the control of the object to be controlled based on the second information and a second neural network that is updated using reinforcement learning, and
controlling the object to be controlled based on the third information, and
wherein, after the updating of the first neural network is performed using a first task, the updating of the first neural network is performed using a second task, a degree of complexity of the second task exceeding a degree of complexity of the first task.

7. The method as claimed in claim 6, further comprising:
updating the first neural network using data obtained from the real environment.

8. The method as claimed in claim 7,
wherein the updating of the first neural network is performed after the updating of the second neural network.

9. The method as claimed in claim 6, further comprising:
updating the second neural network based on a result of the controlling of the object to be controlled using reinforcement learning,
wherein, after the updating of the second neural network is performed using a third task, the updating of the second neural network is performed using a fourth task, a degree of complexity of the fourth task exceeding a degree of complexity of the third task.

10. The method as claimed in claim 5, wherein, after the updating of the first neural network is performed using a first task, the updating of the first neural network is performed using a second task, a degree of complexity of the second task exceeding a degree of complexity of the first task.

11. The method as claimed in claim 6, wherein the first task and the second task are bipedal walking, and a walking speed of the second task is greater than a walking speed of the first task.

12. The method as claimed in claim 6, wherein the updating of the first neural network is performed using the second neural network.

13. The control device as claimed in claim 1, wherein the second information is information related to an action to be performed by the object to be controlled and the third information is information related to a control value that causes the object to be controlled to achieve the action.

14. The control device as claimed in claim 13, wherein the information related to the action is information related to a torque value of a driving part of the object to be controlled.

15. The control device as claimed in claim 13, wherein the information related to the control value is information related to a current value of a driving part of the object to be controlled.

16. The method as claimed in claim 6, wherein the second information is information related to an action to be performed by the object to be controlled and the third information is information related to a control value that causes the object to be controlled to achieve the action.

17. The method as claimed in claim 16, wherein the information related to the action is information related to a torque value of a driving part of the object to be controlled.

18. The method as claimed in claim 16, wherein the information related to the control value is information related to a current value of a driving part of the object to be controlled.

19. The method as claimed in claim 16, wherein the action achieves at least either bipedal walking or object grasping.

20. The control device as claimed in claim 13, wherein the action achieves at least either bipedal walking or object grasping.

21. The control device as claimed in claim 1, wherein the at least one processor is further configured to update the first neural network using data obtained from the real environment.

* * * * *